United States Patent
Kanbe et al.

(10) Patent No.: US 8,705,207 B2
(45) Date of Patent: Apr. 22, 2014

(54) THERMAL-ASSIST MAGNETIC RECORDING MEDIUM AND MAGNETIC RECORDING AND REPRODUCING APPARATUS

(75) Inventors: Tetsuya Kanbe, Chiba (JP); Yuzo Sasaki, Ichihara (JP); Atsushi Hashimoto, Chiba (JP)

(73) Assignee: Showa Denko K.K., Tokyo (JP)

( * ) Notice: Subject to any disclaimer, the term of this patent is extended or adjusted under 35 U.S.C. 154(b) by 789 days.

(21) Appl. No.: 12/627,719

(22) Filed: Nov. 30, 2009

(65) Prior Publication Data

US 2010/0182714 A1 Jul. 22, 2010

(30) Foreign Application Priority Data

Dec. 1, 2008 (JP) ................................ 2008-306653

(51) Int. Cl.
*G11B 5/82* (2006.01)
(52) U.S. Cl.
USPC ........................................ 360/135
(58) Field of Classification Search
None
See application file for complete search history.

(56) References Cited

U.S. PATENT DOCUMENTS

| | | | |
|---|---|---|---|
| 5,965,285 A | 10/1999 | Mihara et al. | |
| 6,830,824 B2 | 12/2004 | Kikitsu et al. | |
| 7,446,969 B2 * | 11/2008 | Akagi et al. | 360/59 |
| 2007/0048552 A1 | 3/2007 | Soeya | |
| 2008/0074776 A1 | 3/2008 | Soeya | |
| 2009/0040644 A1 | 2/2009 | Lu et al. | |

FOREIGN PATENT DOCUMENTS

| | | |
|---|---|---|
| JP | 08-273222 A | 10/1996 |
| JP | 2002-358616 A | 12/2002 |
| JP | 2003-085738 A | 3/2003 |
| JP | 2007-059008 A | 3/2007 |
| JP | 2008-52869 A | 3/2008 |
| JP | 2009-059461 A | 3/2009 |

OTHER PUBLICATIONS

Tim Rausch et al., "Near Field Heat Assisted Magnetic Recording with a Planar Solid Immersion Lens", Japanese Journal of Applied Physics, 2006, pp. 1314-1320, vol. 45, No. 2B, The Japan Society of Applied Physics.

Jan-Ulrich Thiele, et al., "FeRh/FePt Exchange Spring Films for Thermally Assisted Magnetic Recording Media", Allied Physics Letters, Apr. 28, 2003, pp. 2859-2861, vol. 82, No. 17, American Institute of Physics.

Notice of Allowance issued in Japanese Application No. 2008-306653 mailed May 22, 2012.

Jan-Ulrich Thiele, et al., "FeRh/FePt Exchange Spring Films for Thermally Assisted Magnetic Recording Media", Applied Physics Letters, Apr. 28, 2003, pp. 2859-2861, vol. 82, No. 17, American Institute of Physics.

* cited by examiner

*Primary Examiner* — David D Davis
(74) *Attorney, Agent, or Firm* — Sughrue Mion, PLLC

(57) ABSTRACT

A thermal-assist magnetic recording medium is provided which can accomplish a surface recording density of 1 Tbit/inch$^2$. The thermal-assist magnetic recording medium includes: a substrate; a plurality of underlying layers formed on the substrate; a first magnetic layer formed on the underlying layers; a coupling control layer formed on the first magnetic layer and formed of a ferromagnetic alloy; and a second magnetic layer formed on the coupling control layer. Here, Curie temperatures of the first magnetic layer and the second magnetic layer are higher than the Curie temperature of the coupling control layer, an anisotropy magnetic field of the first magnetic layer is greater than the anisotropy magnetic field of the second magnetic layer, and a saturation magnetic field has a minimum value at a temperature of 350° C. or lower.

11 Claims, 5 Drawing Sheets

THERMAL-ASSIST MAGNETIC RECORDING MEDIUM AND MAGNETIC RECORDING AND REPRODUCING APPARATUS

BACKGROUND OF THE INVENTION

1. Field of the Invention

The present invention relates to a thermal-assist magnetic recording medium used in a hard disk device (HDD) and the like and a magnetic recording and reproducing apparatus.

Priority is claimed on Japanese Patent Application No. 2008-306653, filed Dec. 1, 2008, the content of which is incorporated herein by reference.

2. Description of the Related Art

With the recent rapid development of the information-oriented society, an additional increase in capacity has been required for a hard disk device (HDD). To enhance a surface recording density of a magnetic recording medium used in the HDD, it is necessary to reduce the particle size of magnetic crystal grains. However, the decrease in particle size of magnetic particles causes a problem with the deterioration in thermal stability.

In general, $KuV/kT$ (Ku: crystalline magnetic anisotropic constant, V: magnetic particle volume, k: Boltzmann constant, and T: absolute temperature) is used as an indicator indicating the thermal stability. To guarantee satisfactory thermal stability, the value of $KuV/kT$ needs to be equal to or greater than 60.

Since the decrease in size of magnetic particles causes the decrease of V, the value of $KuV/kT$ decreases, thereby deteriorating the thermal stability. To prevent this deterioration in thermal stability, it is necessary to enhance the value of Ku. However, the enhancement in Ku causes an increase in anisotropy magnetic field Hk. This is because the relation of $Ku=(Ms \times Hk)/2$ is established. Accordingly, when the value of Hk is greater than the recording magnetic field of a recording head, a writing operation is not satisfactorily performed and it is thus necessary to set Hk to be lower than the recording magnetic field. This serves as a factor for determining the upper limit of Ku, that is, the lower limit of the decrease in particle size.

The recording magnetic field Hw of an existing recording head is in the range of about 10 to 12 kOe. Hw is determined by the magnetization of a magnetic material used in a magnetic pole, but the magnetization of a FeCo alloy used in the magnetic pole of the existing recording head is in the range of about 2.2 to 2.4 T. This is almost the same as the maximum value of the magnetization of the FeCo alloy indicated by a Slater-Pauling curve. Accordingly, it is difficult to enhance the value of Hw greatly from the existing level. Therefore, in consideration of $KuV/kT>60$, the limit of the decrease in size of the magnetic particles is about 10 nm.

As a technique for solving the limit, a magnetic recording medium called exchange coupled composite (ECC) media was suggested. This is a magnetic recording medium in which a magnetic layer includes a magnetically-hard recording layer (hard layer) and a soft magnetic layer (soft layer) formed thereon.

A thin coupling control layer for properly controlling the interlayer coupling between the hard layer and the soft layer is formed therebetween. By optimizing the thickness of the coupling control layer, the inverting magnetic field of the recording layer (hard layer) can be reduced up to a half or less of the case where the soft layer is not provided. Accordingly, it is possible to increase Hk (increase in Ku), thereby further decreasing the particle size.

In the ECC media, the magnetic particles can be reduced in size up to 6 to 7 nm, in consideration of the recording magnetic field and the thermal stability (Hw=10 to 12 kOe, $KuV/kT>60$) as described above. However, to embody the surface recording density of 1 Tbit/inch$^2$, it is necessary to reduce the size of the magnetic particles up to 6 nm or less and it is thus difficult to embody the technique in the ECC media.

As a technique for accomplishing the surface recording density of 1 Tbit/inch$^2$ or more, thermal-assist recording has attracted attention. The thermal-assist recording is a recording technique of applying near-field light as a laser beam to a medium, locally heating the medium to reduce the coercive force of the medium, and performing a writing operation.

In this case, a writing operation can be performed using the recording magnetic field of the existing head even on a recording medium of which the coercive force at the room temperature is several tens kOe. Accordingly, by forming a recording layer of a material with high Ku of $10^6$ J/m$^3$, it is possible to reduce the size of the magnetic particles up to 6 nm or less with the thermal stability maintained. As such a high-Ku material, a FePt alloy (of which Ku is about $7\times10^6$ J/m$^3$) or a CoPt alloy (of which Ku is about $5\times10^6$ J/m$^3$) having an $L1_0$-type crystal structure was known.

In the thermal-assist recording, to reduce a magnetization transition width to obtain excellent recording and reproducing characteristics, it is necessary to make the temperature gradient of the coercive force as rapid as possible. In general, the temperature gradient of Hc is the rapidest in the vicinity of the Curie temperature. Accordingly, by performing the writing operation after heating the medium up to the vicinity of the Curie temperature, it is possible to reduce the magnetization transition width.

However, for example, in the $L1_0$-type FePt alloy, the Curie temperature is 487° C., which is much greater than the heatproof temperature (about 350° C.) of an HDD glass substrate used widely or the decomposition temperature (about 400° C.) of lubricant. Accordingly, it is difficult to heat the medium up to the vicinity of the Curie temperature.

As a technique for enhancing the temperature gradient of the coercive force at a temperature lower than the heatproof temperature of the glass substrate, a medium in which a FeRh alloy with a B2 structure and a FePt alloy with the $L1_0$-type structure are stacked was suggested (Non-Patent Document 1: Appl. Phys. Lett., Vol. 82, pp. 2859-2861 (2003)). It was known that the FeRh alloy with the B2 structure is transited in phase from antiferromagnetism to ferromagnetism at a transition temperature in the vicinity of 90° C. Accordingly, when the medium is heated up to the vicinity of the transition temperature, the magnetization is caused to assist the magnetization inversion of FePt, thereby rapidly decreasing the coercive force.

It is described in Non-Patent Document 1 that the transition temperature of the FeRh alloy can be enhanced to 200° C. by adding Ir of 3 at%. Accordingly, it is possible to embody the temperature dependency of Hc rapid in the range of 90° C. to 200° C. which is lower than the heatproof temperature of the glass substrate.

As another technique for increasing the temperature gradient of the coercive force at a low temperature, a medium having a structure in which a magnetic layer (switching layer) having a low Curie temperature is interposed between two magnetic layers (a recording layer and a base layer) having a high Curie temperature is disclosed (Patent Document 1: JP-A-2002-358616). Patent Document 1 also describes that the exchange coupling of the recording layer and the base layer disappears by heating the medium up to the Curie temperature or higher of the switching layer, whereby Ku is rapidly decreased with the temperature.

With the same layer structure, a medium in which a CoCrPt—$SiO_2$ recording layer is formed on a $L1_0$-type FePt layer having very high Ku with a γ-FeMn antiferromagnetic layer having a block temperature of 155° C. interposed therebetween is disclosed (see Patent Document 2: JP-A-2007-59008). Patent Document 2 also describes that the exchange coupling of the CoCrPt—$SiO_2$ recording layer and the FePt layer disappears by heating the medium up to the block temperature or higher of the γ-FeMn, whereby Hc can be rapidly decreased with the temperature.

A technique of making the temperature gradient of He rapider by stacking a ferromagnetic recording layer and an antiferromagnetic layer is disclosed (see Patent Document 3: JP-A-2008-52869). Patent Document 3 also describes that the coupling of the ferromagnetic recording layer and the antiferromagnetic layer is made to disappear by heating the medium up to the blocking temperature or higher of the antiferromagnetic layer, whereby Hc is rapidly decreased.

As described above, since the $L1_0$-type FePt alloy or the CoPt alloy having high crystal magnetic anisotropic Ku can be decreased in particle size with the satisfactory thermal stability maintained, such alloys are suitable for the magnetic layer of the thermal-assist magnetic recording medium.

However, to regularize the alloys to obtain the $L1_0$-type crystal structure, it is necessary to heat the substrate at 500° C. or higher or to perform a heating process after forming the layers. Since the temperature is much higher than the heatproof temperature (about 350° C.) of the HDD glass substrate, it is difficult to embody such a structure.

As a countermeasure thereof, it was reported that the regularization temperature can be lowered by adding Ag or Cu to the FePt alloy. However, when the regularization temperature is lowered, the value of Ku is also greatly decreased and thus both have a trade-off relation.

In the thermal-assist recording, to obtain excellent recording and reproducing characteristics, it is necessary to reduce the exchange interaction between the magnetic particles satisfactorily. Accordingly, a medium employing a magnetic layer obtained by adding oxide of $SiO_2$ or carbon (C) to the $L1_0$-type FePt alloy was suggested. However, in this case, it was reported that the regularization of the $L1_0$-type crystal structure is suppressed to lower greatly the value of Ku.

In consideration of the above descriptions, it is very difficult to manufacture a magnetic layer in which the exchange interaction between the particles is sufficiently deactivated and which has a high Ku value of $2 \times 10^6$ J/m³ at a substrate temperature of 350° C. or less.

In case of the FeRh alloy with the B2 structure suggested as the technique for making the temperature gradient of He rapid at a low temperature equal to or lower than the heatproof temperature of the glass substrate, it is necessary to perform a heating process at a high temperature or to heat the substrate for the purpose of regularization. Accordingly, in this case, monocrystalline MgO with high heatproof is used in a substrate and the substrate is heated at 550° C. to regularize the FeRh alloy (see Non-Patent Document 2: Jpn., J. Appl. Phys., Vol 45, no. 2B, pp 1314-1320 (2006)). This temperature is much greater than the heatproof temperature of the glass substrate.

On the other hand, in the techniques disclosed in Patent Documents 1 and 2, the temperature gradient of Hc can be made to be rapid to a certain extent at a low temperature equal to or lower than 350° C. However, to reduce the magnetization transition width, it is important to make the temperature gradient of the saturation magnetic field Hs rather than Hc.

The saturation magnetic field is a magnetic field in which a loop is closed in a magnetization curve. This is a value corresponding to the inverting magnetic field of the particles most hardly causing the magnetization inversion out of the magnetic particles of the magnetic layer, that is, the maximum value of the inverting magnetic field. Accordingly, by making the temperature gradient of the saturation magnetic field rapid, a sharper magnetization transition is caused and thus excellent recording and reproducing characteristics are obtained.

The invention is made in view of the above-mentioned situations, and an object of the invention is to provide a thermal-assist magnetic recording medium which can accomplish a surface recording density of 1 Tbit/inch² or more and a magnetic recording and reproducing apparatus having the thermal-assist magnetic recording medium.

SUMMARY OF THE INVENTION

To achieve the above-mentioned object, the inventors studied hard and found out that the surface recording density of 1 Tbit/inch² or more can be accomplished in a thermal-assist magnetic recording medium by satisfying all the conditions that (1) a film can be formed at a substrate temperature of 350° C. or lower, (2) the saturation magnetic field at the temperature of 350° C. or lower is rapidly lowered with the temperature, and (3) the size of the magnetic particles can be reduced up to 6 nm or less with KuV/kT>60 maintained even when Ku is equal to or less than $2 \times 10^6$ J/m³, thereby completing the invention.

The invention provides the following means.

(1) According to a first aspect of the invention, there is provided a thermal-assist magnetic recording medium including: a substrate; a plurality of underlying layers formed on the substrate; a first magnetic layer formed on the underlying layers; a coupling control layer formed on the first magnetic layer and formed of a ferromagnetic alloy; and a second magnetic layer formed on the coupling control layer, wherein Curie temperatures of the first magnetic layer and the second magnetic layer are higher than the Curie temperature of the coupling control layer, an anisotropy magnetic field of the first magnetic layer is greater than the anisotropy magnetic field of the second magnetic layer, and a saturation magnetic field has a minimum value at a temperature of 350° C. or lower.

(2) According to a second aspect of the invention, in the thermal-assist magnetic recording medium according to the first aspect, the coupling control layer may be formed of an alloy containing Co as a main component and containing at least one element selected from Cr, V, Mn, Cu, Ru, Re, Mo, W, and Ti.

(3) According to a third aspect of the invention, in the thermal-assist magnetic recording medium according to the first aspect, the coupling control layer may be formed of an alloy containing Ni as a main component and containing at least one element selected from Cr, V, Mn, Cu, Ru, Re, Mo, W, Ta, Nb, Al, and Si.

(4) According to a fourth aspect of the invention, in the thermal-assist magnetic recording medium according to the first aspect, the coupling control layer may be formed of an alloy containing Fe as a main component and containing at least one element selected from Cr, V, Mn, and Al.

(5) According to a fifth aspect of the invention, in the thermal-assist magnetic recording medium according to the first aspect, the first magnetic layer may have a granular structure containing Co as a main component and containing an HCP-structure alloy containing Pt and at least one oxide selected from $SiO_2$, $TiO_2$, $ZrO_2$, $Al_2O_3$, $Cr_2O_3$, CoO, and $Ta_2O_5$ or carbon.

(6) According to a sixth aspect of the invention, in the thermal-assist magnetic recording medium according to the first aspect, the first magnetic layer may have a granular structure containing an $L1_0$-structure FePtX (where X=Cu, Ag, or Ni) alloy containing at least one element selected from Cu, Ag, and Ni and at least one oxide selected from $SiO_2$, $TiO_2$, $ZrO_2$, $Al_2O_3$, $Cr_2O_3$, CoO, and $Ta_2O_5$ or carbon.

(7) According to a seventh aspect of the invention, there is provided a thermal-assist magnetic recording medium including: a substrate; a plurality of underlying layers formed on the substrate; a first magnetic layer formed on the underlying layers; a coupling control layer formed on the first magnetic layer and formed of an antiferromagnetic alloy; and a second magnetic layer formed on the coupling control layer, wherein Curie temperatures of the first magnetic layer and the second magnetic layer are higher than a blocking temperature of the coupling control layer, an anisotropy magnetic field of the first magnetic layer is greater than the anisotropy magnetic field of the second magnetic layer, and a saturation magnetic field has a minimum value at a temperature of 350° C. or lower.

(8) According to an eighth aspect of the invention, in the thermal-assist magnetic recording medium according to the seventh aspect, the coupling control layer may be formed one of FeMn, IrMn, RhMn, RuMn, NiMn, PtMn, PdMn, and PdPtMn.

(9) According to a ninth aspect of the invention, in the thermal-assist magnetic recording medium according to the seventh aspect, the first magnetic layer may have a granular structure containing Co as a main component and containing an HCP-structure alloy containing Pt and at least one oxide selected from $SiO_2$, $TiO_2$, $ZrO_2$, $Al_2O_3$, $Cr_2O_3$, CoO, and $Ta_2O_5$ or carbon.

(10) According to a tenth aspect of the invention, in the thermal-assist magnetic recording medium according to the first aspect, the first magnetic layer may have a granUlar structure containing an $L1_0$-structure FePtX (where X=Cu, Ag, or Ni) alloy containing at least one element selected from Cu, Ag, and Ni and at least one oxide selected from $SiO_2$, $TiO_2$, $ZrO_2$, $Al_2O_3$, $Cr_2O_3$, CoO, and $Ta_2O_5$ or carbon.

(11) According to an eleventh aspect of the invention, there is provided a magnetic recording and reproducing apparatus including: the thermal assist magnetic recording medium according to any one of the first to tenth aspects; a medium driver driving the thermal assist magnetic recording medium in a recording direction; a magnetic head including a laser generator heating the thermal-assist magnetic recording medium and a waveguide guiding a laser beam generated from the laser generator to a tip portion and perforining a writing operation and a reproducing operation on the thermal assist magnetic recording medium; a head moving mechanism moving the magnetic head relative to the thermal-assist magnetic recording medium; and a recording and reproducing signal processing system inputting a signal to the magnetic head and reproducing an output signal from the magnetic head.

DETAILED DESCRIPTION OF THE INVENTION

Figure 1:
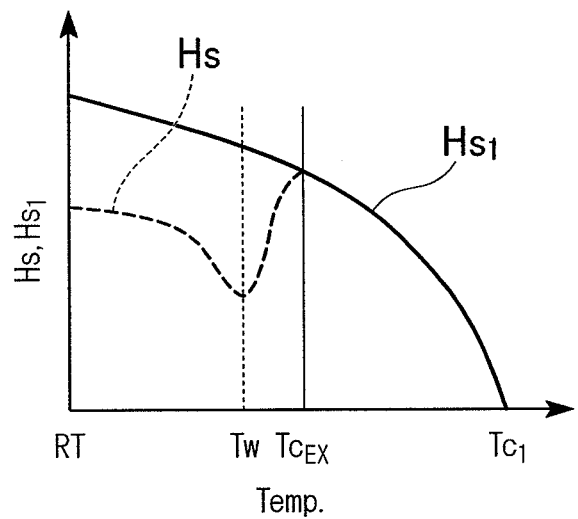
FIG. 1 is a diagram illustrating a temperature dependency of a saturation magnetic field Hs of a thermal assist magnetic recording medium according to an embodiment of the invention.

Hereinafter, embodiments of the invention will be described in detail with reference to the accompanying drawings.

In the drawings referred to in the following description, featured parts may be enlarged for the purpose of easy understanding, and the size ratios of the elements may not be the same as the actual elements. Materials, sizes, and the like exemplified in the following description are only examples, the invention is not limited to the examples, but may be properly modified without departing from the spirit and scope of the invention.

A thermal-assist magnetic recording medium according to an embodiment of the invention includes: a substrate; a plurality of underlying layers formed on the substrate; a first magnetic layer formed on the underlying layers; a coupling control layer formed on the first magnetic layer and formed of a ferromagnetic alloy; and a second magnetic layer formed on the coupling control layer, wherein Curie temperatures of the first magnetic layer and the second magnetic layer are higher than the Curie temperature of the coupling control layer, an anisotropy magnetic field of the first magnetic layer is greater than the anisotropy magnetic field of the second magnetic layer, and a saturation magnetic field has a minimum value at a temperature of 350° C. or lower.

A thermal-assist magnetic recording medium according to another embodiment of the invention includes: a substrate; a plurality of underlying layers formed on the substrate; a first magnetic layer formed on the underlying layers; a coupling control layer formed on the first magnetic layer and formed of an antiferromagnetic alloy; and a second magnetic layer formed on the coupling control layer, wherein Curie temperatures of the first magnetic layer and the second magnetic layer are higher than a blocking temperature of the coupling control layer, an anisotropy magnetic field of the first magnetic layer is greater than the anisotropy magnetic field of the second magnetic layer, and a saturation magnetic field has a minimum value at a temperature of 350° C. or lower.

The inventors made a study of an influence of the temperature gradient of the saturation magnetic field on the recording and reproducing characteristics in the thermal-assist recording and found out that excellent recording and reproducing characteristics are obtained by making the temperature gradient of the saturation magnetic field rapid.

That is, to form a rapid magnetization transition to obtain excellent recording and reproducing characteristics in the thermal-assist recording, it is necessary to make the temperature gradient of the coercive force rapid. The coercive force is a value corresponding to an average value of the inverting magnetic field of magnetic particles of a magnetic layer. On the other hand, the magnetic field closing a loop in a magnetization curve, that is, the saturation magnetic field, is a value corresponding to the maximum value of the inverting magnetic field.

Means for embodying the rapid temperature gradient of the saturation magnetic field will be described below.

First, an example of temperature dependency of the saturation magnetic field Hs in the thermal-assist magnetic recording medium according to an embodiment of the invention is schematically shown in FIG. 1. In FIG. 1, the temperature dependency of the saturation magnetic field $Hs_1$ in a magnetic recording medium having a magnetic layer including only a first magnetic layer is also shown for the purpose of comparison.

As shown in FIG. 1, in a region equal to or less than the Curie temperature of the coupling control layer formed of a ferromagnetic material, that is, $T<Tc_{EX}$, the first magnetic layer and the second magnetic layer are magnetically strongly coupled to each other. Accordingly, the first magnetic layer and the second magnetic layer concurrently cause the magnetization inversion and thus Hs is lower than $Hs_1$. This is because the magnetic anisotropic property is expressed by a weighted average of the first magnetic layer and the second magnetic layer having an anisotropy magnetic field lower than that of the first magnetic layer.

With the rising in temperature, Hs is lowered but the degree of lowering is slow in the temperature region sufficiently lower than $Tc_{EX}$. As the temperature comes close to $Tc_{EX}$, the magnetization of the coupling control layer is rapidly reduced and the exchange coupling of the first magnetic layer and the second magnetic layer is rapidly reduced. The anisotropy magnetic field of the second magnetic layer is lower than the anisotropy magnetic field of the first magnetic layer. Accordingly, when the exchange coupling therebetween is weakened to a certain extent, the second magnetic layer causes the magnetization inversion earlier than the first magnetic layer. As a result, the magnetization inversion of the first magnetic layer is promoted and thus Hs is rapidly lowered. This is similar to the variation of Hs in the ECC magnetic recording medium when the exchange coupling between the hard layer and the soft layer is reduced.

At $T=Tc_{EX}$, the second magnetic layer becomes non-magnetic and the exchange coupling between the first magnetic layer and the second magnetic layer is completely deactivated. Accordingly, the first magnetic layer and the second magnetic layer incoherently cause the magnetization inversion and Hs rises up to a value substantially equal to $Hs_1$. By performing the heating and writing operations up to the vicinity of the temperature where Hs has the minimum value, it is possible to form a rapid magnetization transition. Since Hs rapidly rises up to the heating temperature Tw or higher at the time of recording, it is possible to suppress the re-inversion of the recording magnetization due to heat fluctuation after the recording.

The temperature where Hs has the minimum value can be controlled using the Curie temperature and the thickness of the coupling control layer. As the Curie temperature of the coupling control layer becomes lower or the thickness of the coupling control layer becomes greater, the temperature where Hs has the minimum value is lowered. It is preferable that the minimum value of Hs is equal to or greater than 6 kOe and equal to or less than 9 kOe. When the minimum value of Hs is lower than 6 kOe, the recording bit becomes two wide in a track width direction, which is not preferable. On the other hand, when the minimum value of Hs is higher than 9 kOe, the overwriting characteristic is deteriorated, which is not preferable.

It is preferable that the first magnetic layer has a granular structure containing Co as a main component and containing an HCP-structure alloy containing Pt and at least one oxide selected from $SiO_2$, $TiO_2$, $ZrO_2$, $Al_2O_3$, $Cr_2O_3$, CoO, and $Ta_2O_5$ granular structure containing an $L1_0$-structure FePtX (where X=Cu, Ag, or Ni) alloy containing at least one element selected from Cu, Ag, and Ni and at least one oxide selected from $SiO_2$, $TiO_2$, $ZrO_2$, $Al_2O_3$, $Cr_2O_3$, CoO, and $Ta_2O_5$ or carbon.

Specifically, a CoPt alloy with an HCP structure containing 15 at % of Pt with Ku of $0.8\times10^6$ $J/m^3$ or more and preferably with Ku of $1\times10^6$ $J/m^3$ or more can be used in the first magnetic layer. To reduce the size of the magnetic particles to reduce the exchange interaction between the particles, for example, oxide such as $SiO_2$, $TiO_2$, $ZrO_2$, $Al_2O_3$, $Cr_2O_3$, CoO, and $Ta_2O_5$ or carbon (C) may be added thereto.

As long as the value of Ku is greatly lowered, an element such as Cr, B, Ta, and Cu may be added in addition to the oxide or C. It is preferable that the thickness of the first magnetic layer is equal to or greater than 3 nm to accomplish the high KuV/kT. When the thickness of the first magnetic layer is greater than 20 nm, the crystal grains become larger and thus the recording and reproducing characteristics are deteriorated, whereby it is preferable that the thickness is equal or less than 20 nm.

A regulated alloy such as a $L1_0$-type FePt or CoPt may be used in the first magnetic layer. In this case, to reduce the regulation temperature or the Curie temperature, it is necessary to add Cu, Ag, Ni, or the like. To reduce the exchange coupling between the magnetic particles, for example, it is preferable that oxide such as $SiO_2$, $TiO_2$, $ZrO_2$, $Al_2O_3$, $Cr_2O_3$, CoO, and $Ta_2O_5$ or carbon (C) is added thereto. A result, the value of Ku is lowered but causes no problem as long as it is equal to or greater than $1\times10^6$ $J/m^3$.

A magnetic alloy having an anisotropy magnetic field lower than that of the first magnetic layer is used in the second magnetic layer. Specifically, an alloy with an HCP structure such as CoCrPt, CoCrPtB, CoCrPtTa, CoCrPtTaB, and CoCrPtCu containing Co as a main component can be used. As long as the ferromagnetic property is not lost at a room temperature, other additive elements may be added to the second magnetic layer. The second magnetic layer may be formed of an FCC-structure alloy containing Ni as a main component or a BCC-structure alloy containing Fe as a main component. Particularly, when the $L1_0$-type FePt alloy or CoPt alloy oriented in (001) is used in the first magnetic layer, it is preferable that the BCC-structure alloy containing Fe as a main component is used. An amorphous alloy may be used in the second magnetic layer.

To reduce the minimum value of Hs of the medium as much as possible, the product of the magnetization value and the thickness of the second magnetic layer is preferably as high as possible, but has a trade-off relation with a spacing loss relative to the magnetic head. In the thermal-assist magnetic recording medium according to the embodiment of the invention, the first magnetic layer and the second magnetic layer are magnetically strongly coupled to each other with the coupling control layer interposed therebetween. Accordingly, the KuV/kT of the medium at the room temperature is expressed by the total KuV/kT of the first magnetic layer and the second magnetic layer. That is, it is possible to enhance the KuV/kT of the medium by enhancing the magnetization value or the thickness of the second magnetic layer. Accordingly, the magnetization or the magnetic parameter such as Ku and the thickness of the second magnetic layer needs to be designed in consideration of the above-mentioned factors.

The second magnetic layer may contain oxide such as $SiO_2$, $TiO_2$, $ZrO_2$, $Al_2O_3$, $Cr_2O_3$, CoO, and $Ta_2O_5$ or carbon (C). Here, the content thereof is preferably equal to or less than 6 mol %. That is, the second magnetic layer can reduce the inverting magnetic field of the first magnetic layer at a temperature slightly lower than $Tc_{EX}$ and can reduce the distribution of the inverting magnetic field of the first magnetic layer. This is because the exchange coupling between the magnetic particles of the second magnetic layer is stronger than that of the first magnetic layer in which the magnetic particles are separated by oxide or the like. Accordingly, when the content of the oxide or the carbon (C) is greater than 6 mol %, the exchange coupling between the magnetic particles in the second magnetic layer is rapidly reduced. Accordingly, the effect of reducing the inverting magnetic field distribution of the first magnetic layer is weakened, which is not desirable.

A ferromagnetic alloy of which the Curie temperature is substantially equal to or less than 350° C. can be used in the coupling control layer. Accordingly, the value of Hs is rapidly lowered with the temperature in the temperature range equal to or less than 350° C. and can have the minimum value. However, the temperature at which the Hs has the minimum value is lowered by increasing the coupling control layer. Accordingly, when the temperature at which the Hs has the minimum value is equal to or less than 350° C., the Curie temperature of the coupling control layer may be greater than 350° C.

The material of the coupling control layer is not particularly limited as long as it satisfies the above-mentioned condition. For example, when the HCP-structure Co alloy is used in the first magnetic layer and the second magnetic layer, the coupling control layer is formed of an alloy containing Co as a main component and containing at least one element selected from Cr, V, Mn, Cu, Ru, Re, Mo, W, and Ti to cause the second magnetic layer to have an orientation of (00·1) by epitaxial growth. For example, the HCP-structure alloy such as CoCr, CoV, CoMn, CoCu, CoRu, CoRe, CoMo, CoW, and CoTi can be preferably used. The coupling control layer may be formed of an alloy containing Ni as a main component and containing at least one element selected from Cr, V, Mn, Cu, Ru, Re, Mo, W, Ta, Nb, Al, and Si. For example, the FCC-structure alloy such as NiCr, NiCr, NiV, NiMn, NiCu, NiRu, NiRe, NiMo, NiW, NiTa, NiNb, NiAl, and NiSi can be preferably used.

When the $L1_0$-type FePt alloy or CoPt alloy with the orientation of (001) is used in the first magnetic layer, the coupling control layer is formed of an alloy containing Fe as a main component and containing at least one element selected from Cr, V, Mn, and Al. For example, the BCC-structure alloy such as FeCr, FeV, FeMn, and FeAl or the FCC-structure Ni alloy can be preferably used. In this case, the second magnetic layer can be preferably formed of the BCC-structure alloy such as FeCr. Accordingly, the second magnetic layer grows by epitaxial growth on the coupling control layer and a magnetization easy axis of the second magnetic layer is directed in the direction perpendicular to the film surface similarly to the first magnetic layer, thereby obtaining excellent recording and reproducing characteristics.

In the invention, a medium is heated and recorded up to the temperature at which the Hs has the minimum value. In consideration of the deterioration in film structure or the decomposition of lubricant due to the heat history, it is preferable that the heating temperature at the time of recording is as low as possible. To lower the heating temperature at the time of recording, it is necessary to lower the temperature at which the Hs has the minimum value and it is preferable that the Curie temperature $Tc_{EX}$ of the coupling control layer is as low as possible.

However, when $Tc_{EX}$ is lowered, the magnetization of the coupling control layer at the room temperature is deteriorated and thus the exchange coupling between the first magnetic layer and the second magnetic layer is reduced. When the exchange coupling is weakened to a certain extent or less, protons cause the incoherent magnetization inversion at the room temperature and thus the saturation magnetic field does not vary at the temperature lower than $Tc_{EX}$. Accordingly, $Tc_{EX}$ needs to be set so high that the first magnetic layer and the second magnetic layer simultaneously cause the magnetization inversion at the room temperature.

The heating temperature at the time of recording can be lowered by increasing the thickness of the coupling control layer. Here, when the coupling control layer increases in thickness, the recording and reproducing characteristics are deteriorated by the spacing loss. Accordingly, the thickness of the coupling control layer is preferably equal to or less than 50 nm and more preferably equal to or less than 5 nm.

An antiferromagnetic material of which the blocking temperature is substantially equal to or less than 350° C. may be used in the coupling control layer. Specifically, an alloy with an FCC structure such as FeMn, IrMn, RhMn, RuMn, NiMn, PtMn, PdMn, and PdPtMn can be used. By controlling the blocking temperature and the thickness of the alloy, Hs can be rapidly lowered at the temperature equal to or less than 350° C. to have the minimum value. This is because the exchange coupling between the first magnetic layer and the second magnetic layer is weakened when the medium is heated up to the vicinity of the blocking temperature. The blocking temperature of the alloy can be controlled by changing the composition thereof. In the invention, by heating the medium up to the temperature at which the Hs has the minimum value at the time of recording, excellent recording and reproducing characteristics are obtained, similarly to the case where the ferromagnetic material is used in the coupling control layer.

Plural underlying layers can be formed between the substrate and the first magnetic layer. Here, the underlying layer is a general name of a structure control layer designed to control the orientation or the particle size, a heat sink layer, a soft underlying layer (SUL), and an adhesion improving layer.

When the HCP-structure alloy containing Co as a main component is used in the first magnetic layer, the HCP-structure alloy having the orientation of (00·1) or the FCC_structure alloy having the orientation of (111) is preferably used in the underlying layer to cause the first magnetic layer to have the orientation of (00·1). Specifically, metal such as Ru, Re, and Ti or the HCP-structure metal containing the metal as a main component, or metal such as Ni, Cu, Pd, and Ag or the FCC-structure alloy containing the metal as a main component can be used. The underlying layer may have a stacked structure thereof. Particularly, by using Ru or the like having a high lattice constant in the underlying layer just under the first magnetic layer, a tension stress is introduced into the first magnetic layer and thus the c/a ratio is lowered, thereby enhancing the value of Ku.

On the other hand, when a regularized alloy such as the $L1_0$-type FePt or CoPt is used in the first magnetic layer, an underlying layer of MgO can be preferably used. The MgO has a B1-type (NaCl type) structure and has the orientation of (100). Accordingly, the $L1_0$-type regularized alloy formed on the MgO has the orientation of (001) by epitaxial growth. In this case, the magnetization easy axis is perpendicular to the film surface, thereby obtaining excellent recording and reproducing characteristics.

A BCC-structure or FCC-structure metal or alloy as a structure control layer or a heat sink layer may be introduced between the underlying layer of MgO and the $L1_0$-type regularized metal. Here, the material thereof is limited to materials having the orientation of (100) by epitaxial-growing on the underlying layer of MgO.

As the heat sink layer, Cu or Ag having a high thermal conductivity or an alloy containing them as a main component can be preferably used. A soft magnetic alloy such as FeTaC, CoTaZr, CoNbZr, CoFeTaB, and CoFeTaSi coupled with Ru may be introduced as the SUL. The magnetic field gradient at the time of recording can be made to be rapider due to the introduction of the SUL.

When the $L1_0$-type FePt or CoPt alloy is used in the first magnetic layer, the substrate is heated at a temperature equal to or less than 350° C. In this case, to lower the regularization temperature, it is necessary to add Cu or Ag thereto. The value of Ku is lowered by the addition of the element, but there is no particular problem as long as the medium has the value of Ku equal to or greater than $1\times10^6$ J/m$^3$. When the HCP-structure Co alloy is used in the first magnetic layer, it is not necessary to heat the substrate.

According to the embodiment of the invention, even when a magnetic alloy having the Ku of about $1\times10^6$ J/m$^3$ is used, it is possible to reduce the particle size up to 6 nm or less with KuV/kT>60 kept, thereby embodying the surface recording density of 1 Tbit/inch$^2$. For example, when the CoPt alloy film with Ku=$0.9\times10^6$ J/m$^3$, a particle size of 5 nm, and a thickness of 12 nm is used in the first magnetic layer and it is assumed that there is no exchange interaction between the magnetic particles, it is estimated that the KuV/kT at the room temperature is 51.

When the Co alloy film with Ku=$0.3\times10^6$ J/m$^3$, a particle size of 5 nm, and a thickness of 6 nm is used in the second magnetic layer and it is assumed that there is no exchange interaction between the magnetic particles, it is estimated that the KuV/kT of the Co alloy film at the room temperature is 10. Since the KuV/kT of the medium at the room temperature is expressed by the sum of both values, it is 61. This satisfies the condition (KuV/kT>60) necessary for obtaining excellent thermal stability.

This estimation is on the assumption that no exchange coupling between the magnetic particles exists in the first magnetic layer and the second magnetic layer. However, since weak exchange coupling exists between the magnetic particles of the second magnetic layer, the actual KuV/kT is slightly higher than the estimated value.

When it is assumed that the bit length is three times the particle size of the magnetic particles and the bit aspect ratio is 3:1, it is possible to obtain the surface recording density of 1 Tbit/inch$^2$ using even a CoPt-Oxide alloy with Ku of about $1\times10^6$ J/m$^3$. When the bit aspect ratio can be reduced to 3:1 or less by applying this configuration to a discrete magnetic recording medium, it is also possible to obtain the surface recording density of 2 Tbit/inch$^2$.

As described above, it is possible to embody a thermal-assist magnetic recording medium which can satisfy all the conditions that (1) a film can be formed at a substrate temperature of 350° C. or lower, (2) the saturation magnetic field at the temperature of 350° C. or lower is rapidly lowered with the temperature, and (3) the size of the magnetic particles can be reduced up to 6 nm or less with KuV/kT>60 maintained even when Ku is equal to or less than $2\times10^6$ J/m$^3$, and which has thus the surface recording density of 1 Tbit/inch$^2$ or more, and it is possible to provide a magnetic storage apparatus employing the thermal assist magnetic recording medium.

EXAMPLES

The advantages of the invention will be understood more apparently form the below examples. The invention is not limited to the examples, but may be properly modified without departing from the spirit and scope of the invention.

Example 1

Figure 2:
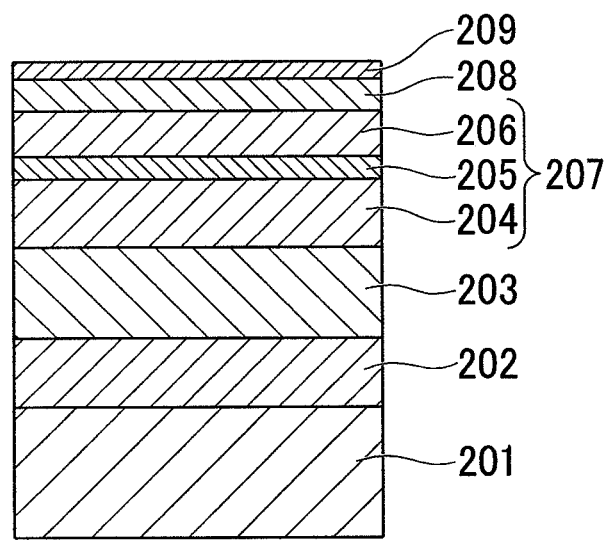
FIG. 2 is a sectional view illustrating a layer structure of a magnetic recording medium according to Example 1.

The layer structure of a magnetic recording medium manufactured according to Example 1 is shown in FIG. 2.

In the magnetic recording medium, a seed layer 202 formed of NiTa with a thickness of 10 nm and a magnetic layer 207 including a first magnetic layer 204 formed of a (Co-25 at % Pt)—(TiO$_2$) alloy with a thickness of 10 nm, a coupling control layer 205 formed of a CoRu alloy, and a second magnetic layer 206 formed of a CoCrPtB alloy with a thickness of 6 nm are stacked on a glass substrate 201 with a heat sink layer 203 formed of Cu with a thickness of 30 nm. After the magnetic layer 207 was formed, a carbon protective layer 208 with a thickness of 3.5 nm was formed and a lubricant film 209 with a thickness of 1.8 nm was formed thereon by application. In the coupling control layer, the Ru concentration (Curie temperature) in a CoRu alloy and the thickness were adjusted so that the saturation magnetic field Hs has the minimum value in the vicinity of 250° C.

The crystal magnetic anisotropy Ku and the anisotropy magnetic field Hk of the first magnetic layer and the second magnetic layer used in the magnetic recording medium according to Example 1 are shown in Table 1.

TABLE 1

|  | Ku (J/m$^3$) | Hk (kOe) |
| --- | --- | --- |
| Second Magnetic Layer | $0.2\times10^6$ | 8.3 |
| First Magnetic Layer | $0.9\times10^6$ | 21.2 |

As shown in Table 1, the anisotropy magnetic field of the first magnetic layer is stronger than that of the second magnetic layer. In spite of the heating up the Curie temperature of the coupling control layer, the magnetizations of the first magnetic layer and the second magnetic layer remained. This states that the Curie temperatures of the first magnetic layer and the second magnetic layer are higher than the Curie temperature of the coupling control layer.

Figure 3:
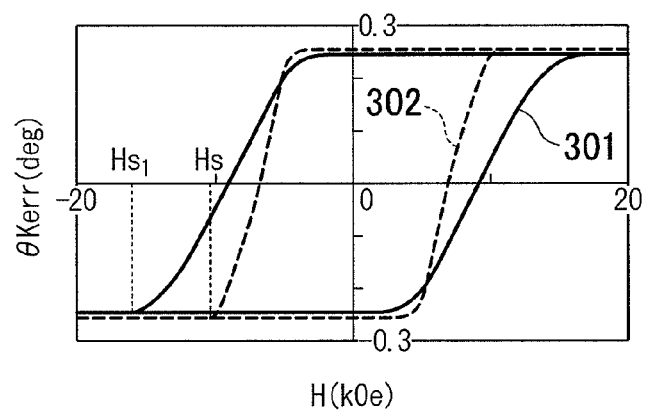
FIG. 3 is a diagram illustrating a magnetization curve of the magnetic recording medium according to Example 1.

A magnetization curve 301 of the magnetic recording medium having the layer structure according to Example 1 and a magnetization curve 302 of a magnetic recording medium in which the magnetic layer 207 in the layer structure according to Example 1 includes only the first magnetic layer 204 are shown in FIG. 3.

As shown in FIG. 3, the saturation magnetic field Hs in the magnetic recording medium according to Example 1 in which the second magnetic layer 206 is formed on the first magnetic layer 204 with the coupling control layer 205 interposed therebetween is lower by 5 kOe than the saturation magnetic field Hs in the magnetic recording medium including only the first magnetic layer 204. In the magnetic recording medium according to Example 1, the gradient of a loop in the vicinity of Hc is rapid and thus it can be seen that a switching magnetic field distribution is reduced.

The temperature dependency of the saturation magnetic field measured in the magnetic recording medium according to Example 1 has the same tendency as shown in FIG. 3, and has the minimum value in the vicinity of 250° C. This is because the exchange coupling between the first magnetic layer 204 and the second magnetic layer 206 is rapidly reduced in the vicinity of 250° C. That is, with the reduction in exchange coupling, it is through that the second magnetic layer 206 having a weak anisotropy magnetic field first caused the magnetization inversion and this assisted the magnetization inversion of the first magnetic layer 204, whereby Hs was rapidly lowered.

When the magnetic recording medium is heated up to a temperature equal to or higher than the Curie temperature of the coupling control layer 205, the exchange coupling between the first magnetic layer 204 and the second magnetic layer 206 completely disappears and both cause the magnetization inversion incoherently. Since the anisotropy magnetic field of the first magnetic layer 204 is stronger than the anisotropy magnetic field of the second magnetic layer 206, the saturation magnetic field of the medium rapidly increases and becomes equal to the Hs of the first magnetic layer 204. Accordingly, the re-inversion of the magnetization after the recording is suppressed without extremely lowering the Hs with the rising in temperature.

In the magnetic recording medium according to Example 1, the minimum value of Hs is 7.8 kOe. To obtain an excellent overwriting characteristic, the minimum value of Hs is preferably 9 kOe or less and more preferably 8 kOe or less. However, when the minimum value of Hs is excessively lowered, the recording bit is excessively widened in the track width direction, and thus the minimum value is preferably 6 kOe or more. The minimum value of Hs can be also lowered by increasing the magnetization or the thickness of the second magnetic layer 206. The saturation magnetic field of the first magnetic layer 204 may be lowered.

In this case, it is necessary to maintain KuV/kT>60.

As the measurement result of X-ray diffraction on the magnetic recording medium according to Example 1, the Cu heat sink layer 203 exhibited the orientation of FCC(111) and a strong peak of HCP(00.2) was observed from the magnetic layer 207. Accordingly, it could be seen that the Cu heat sink layer 203 is effectively used as an orientation control layer for causing the magnetic layer 207 to have a perpendicular orientation.

Then, the magnetic recording medium according to Example 1 was heated up to the temperature at which the Hs has the minimum value and the recording and reproducing characteristics thereof were tested. The structure of a magnetic head used in this test is schematically shown in FIG. 4.

The magnetic head includes a recording head 401 and a reproducing head 410. The recording head 401 includes an upper magnetic pole 402, a lower magnetic pole 403, and a PSIM (Planar Solid Immersion Mirror) 404 interposed therebetween. The PSIM can have, for example, the structure described in Non-Patent Document 2. The recording head 401 applies a semiconductor laser 407 with a wavelength of 500 nm to a grating portion 405 of the PSIM 404 from a laser source 406 and performs a recording operation while heating a magnetic recording medium 409 using near-field light 408 generated from the tip of the PSIM 404. On the other hand, the reproducing head 410 includes a TMR element 413 interposed between an upper shield 411 and a lower shield 412.

Figure 4:
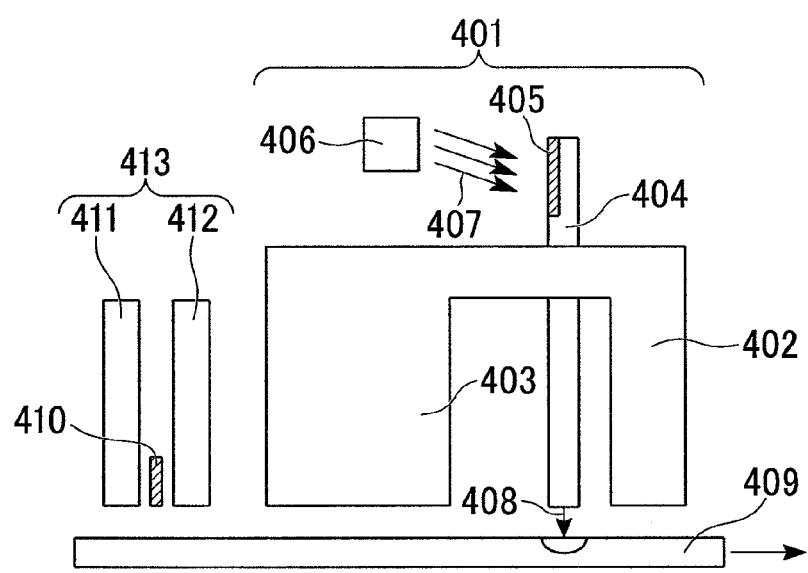
FIG. 4 is a diagram schematically illustrating the configuration of a magnetic head used in the invention.

The magnetic recording medium according to Example 1 was heated up to the temperature at which the Hs has the minimum value using the magnetic head shown in FIG. 4 and an all-one pattern signal with a linear recording density of 2000 kFCI (kilo Flux Changes per Inch) was recorded thereon to perform a reproducing operation. As a result, an excellent overwriting characteristic and a high medium SN ratio were obtained.

In the magnetic recording medium according to Example 1, $TiO_2$, $ZrO_2$, $Al_2O_3$, $Cr_2O_3$, CoO, $Ta_2O_5$, and the like in addition to $SiO_2$ can be used as the oxide contained in the first magnetic layer 204. As long as the HCP structure can be maintained without greatly deteriorating Ku, additive elements such as Cr, Ta, B, and Cu may be contained.

In addition to the CoCrPtB alloy, an alloy with the HCP structure such as CoCrPt, CorCrPtTa, CoCrPtCu, or CoCrPt-TaB or an alloy with the FCC structure such as NiFe, NiCo, NiV, NiMn, or NiSi may be used in the second magnetic layer 206.

An alloy such as CoCr, CoV, CoMn, CoW, or CoMo of which the Curie temperature is lowered substantially to 350° C. or less may be used in the coupling control layer 205. A material obtained by adding oxides such as $SiO_2$, $TiO_2$, $ZrO_2$, $Al_2O_3$, $Cr_2O_3$, CoO, and $Ta_2O_5$ to the alloy may be used.

Example 2

In Example 2, a magnetic recording medium having the same layer structure as in Example 1 was manufactured, except that a (Co-20 at % Pt)-7 mol % ($SiO_2$) alloy with a thickness of 12 nm is used in the first magnetic layer 204, a Ni-2 at % Cr alloy with a thickness of 5 nm is used in the coupling control layer 205, and a Co-11 at % Cr-13 at % Pt-5 at % B alloy with a thickness of 5 nm is used in the second magnetic layer 206.

In the magnetic recording medium according to Example 2, the Curie temperature of the coupling control layer 205 was 310° C. The curie temperatures of the first magnetic layer 204 and the second magnetic layer 206 were higher than that of the coupling control layer 205 and the magnetizations thereof remained at a temperature equal to or more than 310° C.

Figure 5:
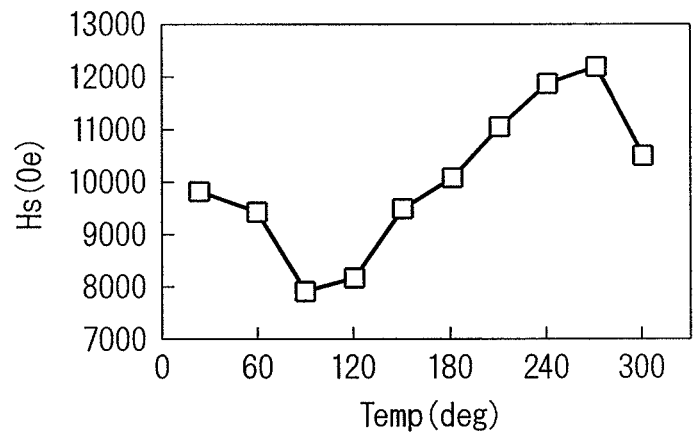
FIG. 5 is a diagram illustrating the temperature dependency of Hs in a magnetic recording medium according to Example 2.

The temperature dependency of Hs in the magnetic recording medium according to Example 2 is shown in FIG. 5.

As shown in FIG. 5, in the magnetic recording medium according to Example 2, Hs had the minimum value in the vicinity of 120° C. and the minimum value was 7.9 kOe. The KuV/kT of the medium measured at the room temperature was 77 and the thermal stability was excellent. The magnetic recording medium according to Example 2 was heated up to the temperature at which the Hs has the minimum value using the magnetic head shown in FIG. 4 and an all-one pattern signal with a linear recording density of 1800 kFCI (kilo Flux Changes per Inch) was recorded thereon to perform a reproducing operation. As a result, an excellent overwriting characteristic and a high medium SN ratio were obtained.

From the above-mentioned result, it could be seen that the same advantage as in the case using the CoRu alloy was obtained using the NiCr alloy as the coupling control layer 205.

In the magnetic recording medium according to Example 2, the same advantage is obtained even when a NiAl alloy, a NiCr alloy, a NiCu alloy, a NiMn alloy, a NiMo alloy, a NiV alloy, a NiRe alloy, a NiRu alloy, a NiSi alloy, a NiTa alloy, and a NiW alloy in addition to the NiCr alloy are used in the coupling control layer 205.

Materials obtained by adding oxides such as $SiO_2$, $TiO_2$, $ZtO_2$, $Al_2O_3$, $Cr_2O_3$, CoO, and $Ta_2O_5$ to the alloy may be used.

Example 3

Figure 6:
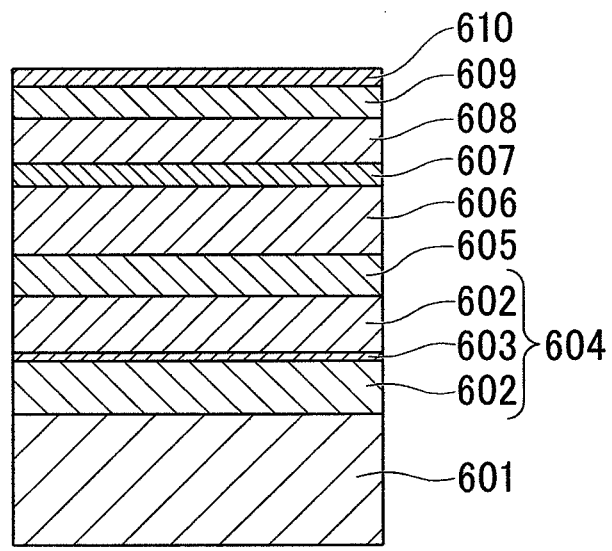
FIG. 6 is a sectional view illustrating a layer structure of a magnetic recording medium according to Example 3.

The layer structure of a magnetic recording medium manufactured in Example 3 is shown in FIG. 6.

The magnetic recording medium according to Example 3 is manufactured by sequentially forming a soft magnetic underlying layer (SUL) 604 including CoTaZr alloys 602 antiferromagnetically coupled to each other with a Ru layer 603 interposed therebetween with a total thickness of 50 nm, an underlaying layer 605 formed of NiWB with a thickness of 5 nm, a heat sink layer 606 formed of AgCu with a thickness of 30 nm, a magnetic layer including a first magnetic layer 607, a coupling control layer 608, and a second magnetic layer 609, a carbon protective layer 610, and a lubricant film 611 on a non-magnetic substrate 601.

In Example 3, the substrate is not heated. In addition to the above-mentioned materials, soft magnetic alloys such as FeTaC, CoTaZr, CoNbZr, CoFeTaB, and CoFeTaSi may be used in the SUL 604. A (Co—20 at % Pt)—$SiO_2$—$TiO_2$ alloy with a thickness of 12 nm was used in the first magnetic layer 607 and a CoCrTa alloy with a thickness of 6 nm was used in the second magnetic layer 609. The anisotropy magnetic fields of the first magnetic layer 607 and the second magnetic layer 609 were 21.4 kOe and 11.6 kOe, respectively. Antiferromagnetic alloys such as FeMn, IrMn, RhMn, RuMn, NiMn, PtMn, PdMn, and PdPtMn were used in the coupling control layer 608 and the thickness thereof was equal to or greater than 2 nm and equal to or less than 10 mm The temperature dependency of Hs in the magnetic recording medium according to Example 3 is shown in FIG. 7.

Figure 7:
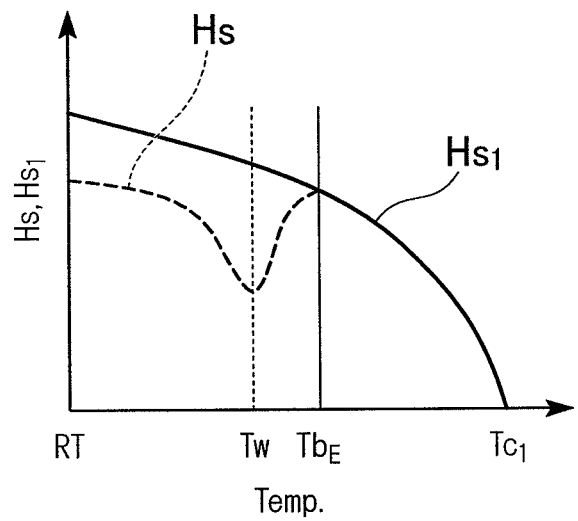
FIG. 7 is a diagram illustrating the temperature dependency of Hs in a magnetic recording medium according to Example 3.

As shown in FIG. 7, in the magnetic recording medium according to Example 3, Hs was rapidly lowered just below the blocking temperature $Tb_{EX}$ of the coupling control layer 608 and tended to have the minimum value. This is because the exchange coupling between the first magnetic layer 607 and the second magnetic layer 609 is rapidly reduced just below the blocking temperature. It is through that the second magnetic layer 609 having a weak anisotropy magnetic field first caused the magnetization inversion and this assisted the magnetization inversion of the first magnetic layer 607, whereby the saturation magnetic field was rapidly lowered.

In the magnetic recording medium according to Example 3, the average particle size in the magnetic layer estimated by the observation with a transmission electron microscope was 5.1 nm. This is because the basic particle size is reduced due to the NiWB underlying layer 605. The KuV/kT of the medium measured at the room temperature was 60 or higher, whereby it could be seen that the medium is a thermally stable medium.

The crystal orientation of the magnetic recording medium according to Example 3 was measured by X-ray diffraction. As a result, the AgCu heat sink layer 606 had the orientation of (111) and the magnetic layer had the orientation of (00·1). The NiWB underlying layer 605 was very thin and thus a clear diffraction peak was not observed therefrom, but it is thought that the NiWB underlying layer has the orientation of (111) because the AgCu heat sink layer 606 formed thereon has the orientation of (111).

The magnetic recording medium according to Example 3 was heated up to the temperature at which the Hs has the minimum value using the magnetic head shown in FIG. 4 and an all-one pattern signal with a linear recording density of 1800 kFCI (kilo Flux Changes per Inch) was recorded thereon to perform a reproducing operation. As a result, an excellent overwriting characteristic and a high medium SN ratio were obtained.

Example 4

Figure 8:
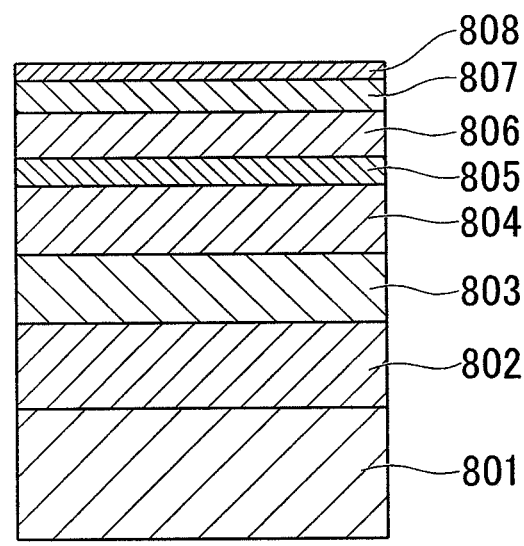
FIG. 8 is a sectional view illustrating a layer structure of a magnetic recording medium according to Example 4.

The layer structure of a magnetic recording medium manufactured in Example 4 is shown in FIG. 8.

The magnetic recording medium according to Example 4 is manufactured by sequentially forming an underlying layer 802 formed of MgO with a thickness of 10 nm, a heat sink layer 803 formed of Ag with a thickness of 20 nm, a magnetic layer including a first magnetic layer 804, a coupling control layer 805, and a second magnetic layer 806, a carbon protective layer 807, and a lubricant film 808 on a glass substrate 801.

A (Fe-55 at % Pt-5 at % Cu)—$SiO_2$ alloy with a thickness of 10 nm was used in the first magnetic layer 804. Here, after the heat sink layer 803 was formed, the glass substrate 801 was heated to 350° C. using a lamp heater. After a FeCr—$SiO_2$ alloy was formed as the coupling control layer 805 and an FeV alloy with a thickness of 6 nm was formed as the second magnetic layer 806, the carbon protective layer 807 with a thickness of 3.5 nm was formed and the lubricant film 808 with a thickness of 1.8 nm was formed by application. The thickness of the coupling control layer 805 was adjusted so that the Curie temperature thereof is about 300° C.

In the magnetic recording medium according to Example 4, the anisotropy magnetic field of the first magnetic layer 804 was 27.4 kOe, which was much greater than the anisotropy magnetic field of the second magnetic layer 806. This is because the first magnetic layer 804 increases in Ku by the regularization as described later. Since the second magnetic layer 806 is not an HCP alloy having a uniaxial anisotropic property but a BCC alloy, Ku thereof is much lower than that of the first magnetic layer 804.

In the magnetic recording medium according to Example 4, the Curie temperatures of the first magnetic layer 804 and the second magnetic layer 806 were both equal to or greater than 300° C. and were higher than the Curie temperature of the coupling control layer 805. The temperature dependency of Hs in the magnetic recording medium according to Example 4 was measured and the Hs had the minimum value in the vicinity of 270° C. just below of the Curie temperature of the coupling control layer 805.

As the measurement result of the crystal orientation of the magnetic recording medium according to Example 4 by the X-ray diffraction, the (001) peak which are the super-lattice reflected ray of the $L1_0$-type regularized alloy and the (003) peak were observed in addition to the (002) peak from the first magnetic layer 804 formed of FePtCu—$SiO_2$ and the (004) peak. Accordingly, in the magnetic recording medium according to Example 4, it could be seen that the FePtCu alloy of the first magnetic layer 804 has the $L1_0$-type regularized structure. This is because the regularization temperature is lowered by adding Cu to the FePt and setting the composition ratio of FePt to Fe:Pt=45:55 in which Pt is rich. The MgO underlying layer 802 and the heat sink layer 803 both had the orientation of (100).

From the above-mentioned result, it could be seen in the magnetic recording medium according to Example 4 that the heat sink layer 803 has the orientation of (100) by using MgO in the underlying layer 802 and thus the $L1_0$-type FePtCu alloy could be made to have the orientation of (100).

As the observation result using an electron microscope, the magnetic recording medium according to Example 4 had a granular structure in which a crystal phase is surrounded with an amorphous phase. Since the average particle size was 4.8 nm which is very small but the KuV/kT was 64 which is high, it could be seen that the thermal stability is excellent.

Figure 9:
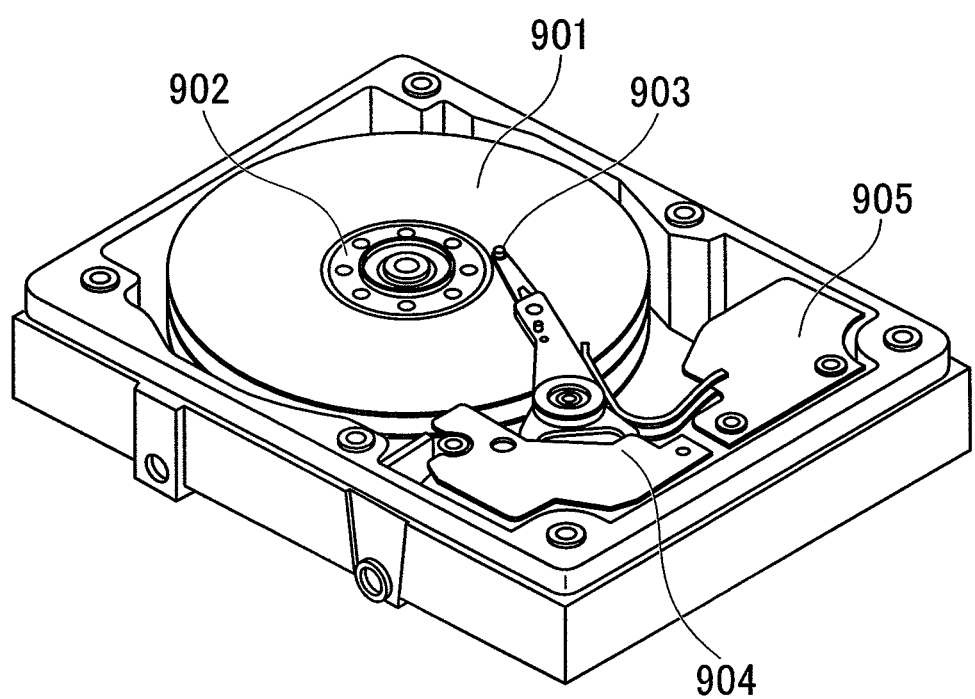
FIG. 9 is a perspective view illustrating a magnetic recording and reproducing apparatus to which the invention is applied.

The magnetic recording medium according to the examples along with the magnetic head shown in FIG. 4 was assembled into a magnetic recording and reproducing apparatus shown in FIG. 9. That is, the magnetic recording and reproducing apparatus includes a thermal assist magnetic recording medium 901 according to the embodiment of the invention, a medium driver 902 driving the thermal assist magnetic recording medium 901 in a recording direction, a magnetic head 903 performing a writing operation and a reproducing operation on the thermal assist magnetic recording medium 901, a head moving mechanism 904 moving the magnetic head 903 relative to the thermal-assist magnetic recording medium 901, and a recording and reproducing signal processing system 905 inputting a signal to the magnetic head 903 and reproducing an output signal from the magnetic head 903.

As the estimation result of the recording and reproducing characteristics of the magnetic recording and reproducing apparatus, an excellent SN ratio was obtained.

As described above, according to the invention, it is possible to provide a thermal-assist magnetic recording medium with a surface recording density of 1 Tbit/inch$^2$ or more and to provide a magnetic recording and reproducing apparatus employing the thermal-assist magnetic recording medium.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A thermal-assist magnetic recording medium comprising:
    a substrate;
    a plurality of underlying layers formed on the substrate;
    a first magnetic layer formed on the underlying layers;
    a coupling control layer formed on the first magnetic layer and formed of a ferromagnetic alloy; and
    a second magnetic layer formed on the coupling control layer,
    wherein the first magnetic layer and the second magnetic layer have Curie temperatures higher than the Curie temperature of the coupling control layer,
    wherein an anisotropy magnetic field of the first magnetic layer is greater than the anisotropy magnetic field of the second magnetic layer, and
    wherein a saturation magnetic field has a minimum value at a temperature of 350° C. or lower and increases after reaching the minimum value.

2. The thermal-assist magnetic recording medium according to claim 1, wherein the coupling control layer is formed of an alloy containing Co as a main component and containing at least one element selected from Cr, V, Mn, Cu, Ru, Re, Mo, W, and Ti.

3. The thermal-assist magnetic recording medium according to claim 1, wherein the coupling control layer is formed of an alloy containing Ni as a main component and containing at least one element selected from Cr, V, Mn, Cu, Ru, Re, Mo, W, Ta, Nb, Al, and Si.

4. The thermal-assist magnetic recording medium according to claim 1, wherein the coupling control layer is formed of an alloy containing Fe as a main component and containing at least one element selected from Cr, V, Mn, and Al.

5. The thermal-assist magnetic recording medium according to claim 1, wherein the first magnetic layer has a granular structure containing Co as a main component and containing an HCP-structure alloy containing Pt and at least one oxide selected from $SiO_2$, $TiO_2$, $ZrO_2$, $Al_2O_3$, $Cr_2O_3$, CoO, and $Ta_2O_5$ or carbon.

6. The thermal-assist magnetic recording medium according to claim 1, wherein the first magnetic layer has a granular structure containing an $L1_0$-structure FePtX (where X=Cu, Ag, or Ni) alloy containing at least one element selected from Cu, Ag, and Ni and at least one oxide selected from $SiO_2$, $TiO_2$, $ZrO_2$, $Al_2O_3$, $Cr_2O_3$, CoO, and $Ta_2O_5$ or carbon.

7. A magnetic recording and reproducing apparatus comprising:
    the thermal assist magnetic recording medium according to claim 1;
    a medium driver driving the thermal assist magnetic recording medium in a recording direction;
    a magnetic head including a laser generator heating the thermal-assist magnetic recording medium and a waveguide guiding a laser beam generated from the laser generator to a tip portion and performing a writing operation and a reproducing operation on the thermal assist magnetic recording medium;
    a head moving mechanism moving the magnetic head relative to the thermal-assist magnetic recording medium; and
    a recording and reproducing signal processing system inputting a signal to the magnetic head and reproducing an output signal from the magnetic head.

8. A thermal-assist magnetic recording medium comprising:
    a substrate;
    a plurality of underlying layers formed on the substrate;
    a first magnetic layer formed on the underlying layers;
    a coupling control layer formed on the first magnetic layer and formed of an antiferromagnetic alloy; and
    a second magnetic layer formed on the coupling control layer,
    wherein the first magnetic layer and the second magnetic layer have Curie temperatures higher than a blocking temperature of the coupling control layer,
    wherein an anisotropy magnetic field of the first magnetic layer is greater than the anisotropy magnetic field of the second magnetic layer, and
    wherein a saturation magnetic field has a minimum value at a temperature of 350° C. or lower and increases after reaching the minimum value.

9. The thermal-assist magnetic recording medium according to claim 8, wherein the coupling control layer is formed one of FeMn, IrMn, RhMn, RuMn, NiMn, PtMn, PdMn, and PdPtMn.

10. The thermal-assist magnetic recording medium according to claim 8, wherein the first magnetic layer has a granular structure containing Co as a main component and containing an HCP-structure alloy containing Pt and at least one oxide selected from $SiO_2$, $TiO_2$, $ZrO_2$, $Al_2O_3$, $Cr_2O_3$, CoO, and $Ta_2O_5$ or carbon.

11. The thermal-assist magnetic recording medium according to claim 8, wherein the first magnetic layer has a granular structure containing an $L1_0$-structure FePtX (where X=Cu, Ag, or Ni) alloy containing at least one element selected from Cu, Ag, and Ni and at least one oxide selected from $SiO_2$, $TiO_2$, $ZrO_2$, $Al_2O_3$, $Cr_2O_3$, CoO, and $Ta_2O_5$ or carbon.

* * * * *